(12) United States Patent
Maxwell (10) Patent No.: US 9,448,311 B2
(45) Date of Patent: Sep. 20, 2016

(54) UNDERWATER NODE FOR SEISMIC SURVEYS AND METHOD

(71) Applicant: Seabed Geosolutions B.V., Leidschendam (NL)

(72) Inventor: Peter Maxwell, Missouri City, TX (US)

(73) Assignee: SEABED GEOSOLUTIONS B.V., Leidschendam (NL)

( * ) Notice: Subject to any disclaimer, the term of this patent is extended or adjusted under 35 U.S.C. 154(b) by 413 days.

(21) Appl. No.: 13/755,541

(22) Filed: Jan. 31, 2013

(65) Prior Publication Data

US 2014/0211589 A1    Jul. 31, 2014

(51) Int. Cl.
    *G01V 1/06*    (2006.01)
    *G01V 1/18*    (2006.01)
    *G01V 1/38*    (2006.01)

(52) U.S. Cl.
    CPC . *G01V 1/18* (2013.01); *G01V 1/38* (2013.01); *G01V 2210/1427* (2013.01)

(58) Field of Classification Search
    USPC ............................................. 367/15
    See application file for complete search history.

(56) References Cited

U.S. PATENT DOCUMENTS

| | | | |
|---|---|---|---|
| 6,932,185 B2 | 8/2005 | Bary et al. | |
| 7,646,670 B2 | 1/2010 | Maxwell et al. | |
| 8,675,446 B2 * | 3/2014 | Gateman et al. | 367/20 |
| 2005/0098377 A1 * | 5/2005 | Bary et al. | 181/112 |
| 2008/0080318 A1 * | 4/2008 | Maxwell et al. | 367/131 |
| 2008/0144442 A1 * | 6/2008 | Combee et al. | 367/131 |
| 2010/0074048 A1 * | 3/2010 | Furuhaug | 367/15 |
| 2010/0195435 A1 * | 8/2010 | Berland | 367/20 |
| 2011/0216625 A1 | 9/2011 | Manin et al. | |
| 2013/0058192 A1 * | 3/2013 | Gateman et al. | 367/20 |
| 2013/0083622 A1 * | 4/2013 | Herrmann et al. | 367/15 |
| 2013/0163374 A1 * | 6/2013 | Herrmann | 367/20 |
| 2014/0078861 A1 * | 3/2014 | Tamanaja | 367/16 |
| 2014/0226440 A1 * | 8/2014 | Gosling | 367/16 |

FOREIGN PATENT DOCUMENTS

| | | |
|---|---|---|
| EP | 1217390 A1 | 6/2002 |
| WO | 2011/139159 A1 | 11/2011 |

OTHER PUBLICATIONS

International Search Report dated Apr. 24, 2014, in related International Application No. PCT/EP2014/051702 (The two US Patents cited in the ISR were previously cited in the IDS filed Jan. 31, 2013).

Written Opinion of the International Searching Authority dated Apr. 24, 2014, in related International Application No. PCT/EP2014/051702.

* cited by examiner

*Primary Examiner* — James Hulka
(74) *Attorney, Agent, or Firm* — Park, Vaughan, Fleming & Dowler LLP; Shane A. Nelson (57) ABSTRACT

A method, system and a marine node for recording seismic waves underwater. The node includes a first module configured to house a seismic sensor; bottom and top plates attached to the first module; a second module removably attached to the first module and configured to slide between the bottom and top plates, the second module including a first battery and a data storage device; and a third module removably attached to the first module and configured to slide between the bottom and top plates, the third module including a second battery.

29 Claims, 9 Drawing Sheets

UNDERWATER NODE FOR SEISMIC SURVEYS AND METHOD

BACKGROUND

1. Technical Field

Embodiments of the subject matter disclosed herein generally relate to methods and systems and, more particularly, to mechanisms and techniques for performing a marine seismic survey using underwater nodes that carry appropriate seismic sensors.

2. Discussion of the Background

Marine seismic data acquisition and processing generate a profile (image) of a geophysical structure under the seafloor. While this profile does not provide an accurate location of oil and gas reservoirs, it suggests, to those trained in the field, the presence or absence of these reservoirs. Thus, providing a high-resolution image of geophysical structures under the seafloor is an ongoing process.

Reflection seismology is a method of geophysical exploration to determine the properties of earth's subsurface, which is especially helpful in the oil and gas industry. Marine reflection seismology is based on using a controlled source of energy that sends the energy into the earth. By measuring the time it takes for the reflections to come back to plural receivers, it is possible to evaluate the depth of features causing such reflections. These features may be associated with subterranean hydrocarbon deposits.

Figure 1:
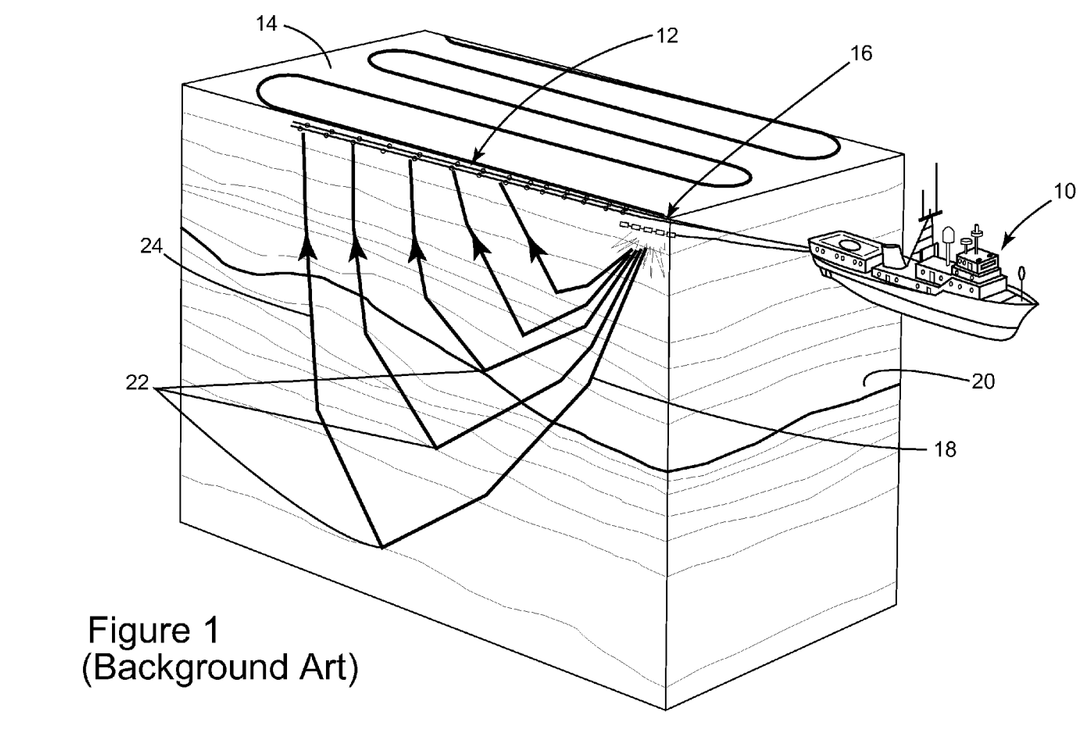
FIG. 1 is a schematic diagram of a conventional seismic survey system.

A traditional system for generating seismic waves and recording their reflections off geological structures present in the subsurface is illustrated in FIG. 1. A vessel 10 tows an array of seismic receivers 11 provided on streamers 12. The streamers may be disposed horizontally, i.e., lying at a constant depth relative to the ocean surface 14. The streamers may be disposed to have other than horizontal spatial arrangements. The vessel 10 also tows a seismic source array 16 configured to generate a seismic wave 18. The seismic wave 18 propagates downward toward the seafloor 20 and penetrates the seafloor until eventually a reflecting structure 22 (reflector) reflects the seismic wave. The reflected seismic wave 24 propagates upward until it is detected by the receiver 11 on the streamer 12. Based on the data collected by the receiver 11, an image of the subsurface is generated by further analyses of the collected data. The seismic source array 16 includes plural individual source elements.

However, this traditional configuration is expensive because the cost of the streamers is high. In addition, this configuration might not provide accurate results because coupling between seismic receivers and the sea water is poor for s-waves. To overcome this last problem, new technologies deploy plural seismic sensors on the bottom of the ocean to improve the coupling.

One such new technology is ocean bottom station (OBS) nodes. OBSs are capable of providing better data than conventional acquisition systems because of their wide-azimuth geometry. Wide-azimuth coverage is helpful for imaging beneath complex overburdens such as those associated with salt bodies. Salt bodies act like huge lenses, distorting seismic waves propagating through them. To image subsalt targets, it is preferable to have the capability to image through complex overburdens, but even the best imaging technology alone is not enough. Good illumination of the targets is necessary. Conventional streamer surveys are operated with a single seismic vessel and have narrow azimuthal coverage. If either the source or the receiver is located above an overburden anomaly, the illumination of some targets is likely to be poor. OBS nodes can achieve wide-azimuth geometry and solve this problem.

Additionally, OBS nodes are more practical in the presence of obstacles such as production facilities. For the purpose of seismic monitoring with repeat surveys (4D), OBSs have better positioning repeatability than streamers. Also, OBSs provide multi-component data that can separate up- and down-going waves at the seabed, which is useful for multiple attenuations and for imaging using the multiples. In addition, multi-component data allows for recording shear waves, which provides additional information about lithology and fractures, and sometimes allows for imaging targets that have low reflectivity or which are under gas clouds.

Figure 2:
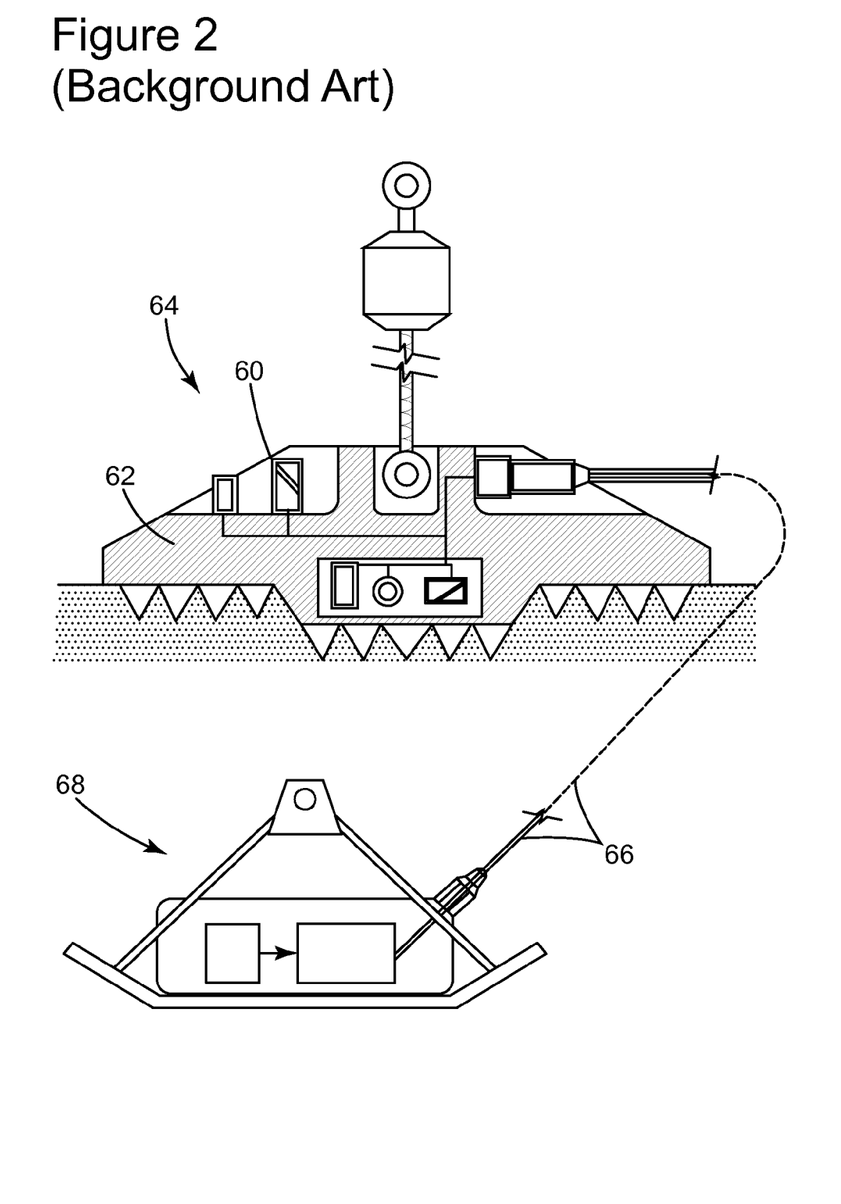
FIG. 2 is a schematic diagram of a station that may be positioned on the ocean bottom for seismic data recording.

U.S. Pat. No. 6,932,185, the entire content of which is incorporated herein by reference, discloses an OBS. In this case, the seismic sensors 60 are attached, as shown in FIG. 2 (which corresponds to FIG. 4 of the patent), to a heavy pedestal 62. A station 64 that includes the sensors 60 is launched from a vessel and arrives, due to its gravity, at a desired position. The station 64 remains on the ocean bottom permanently. Data recorded by sensors 60 is transferred through a cable 66 to a mobile station 68. When necessary, the mobile station 68 may be brought to the surface to retrieve the data.

Although this method provides a better coupling between the seabed and the sensors, the method is still expensive and not flexible because the stations and corresponding sensors are left on the seabed.

Figure 3:
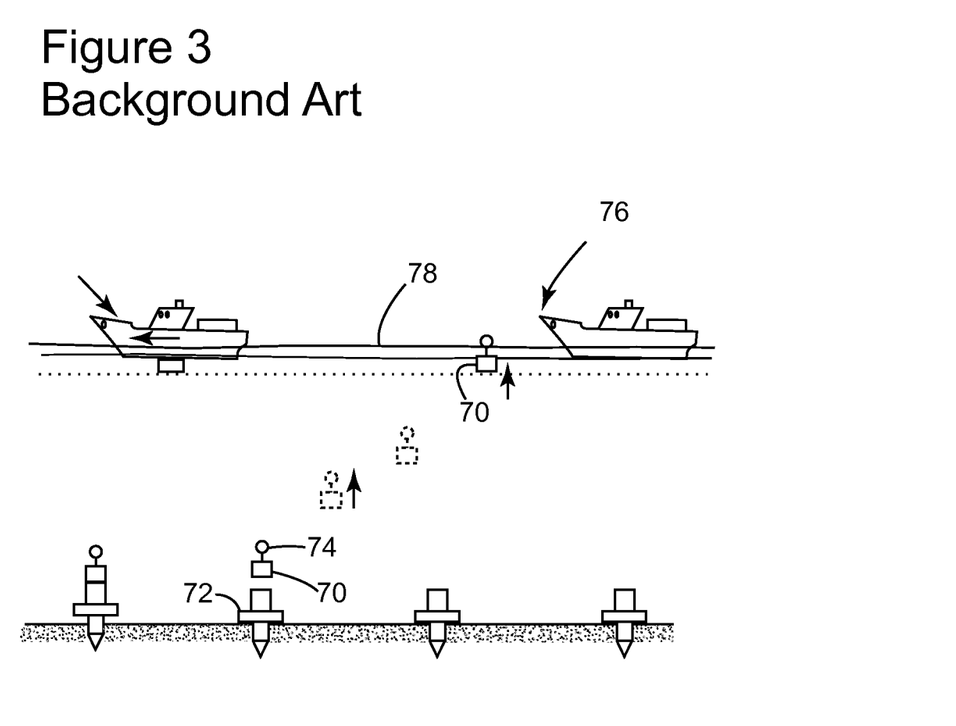
FIG. 3 is a schematic diagram of another station that may be positioned on the ocean bottom for seismic data recording.

An improvement to this method is described, for example, in European Patent No. EP 1 217 390, the entire content of which is incorporated herein by reference. In this document, a sensor 70 (see FIG. 3) is removably attached to a pedestal 72 together with a memory device 74. After recording the seismic waves, the sensor 70 and memory device 74 are instructed by a vessel 76 to detach from the pedestal 72 and rise to the ocean surface 78 to be picked up by the vessel 76.

However, this configuration is not very reliable because the mechanism maintaining the sensor 70 connected to the pedestal 72 may fail to release the sensor 70. Also, the sensor 70 and pedestal 72 may not reach their intended positions on the ocean bottom. Further, leaving the pedestals 72 behind contributes to ocean pollution and increases survey cost, which are both undesirable.

Figure 4:
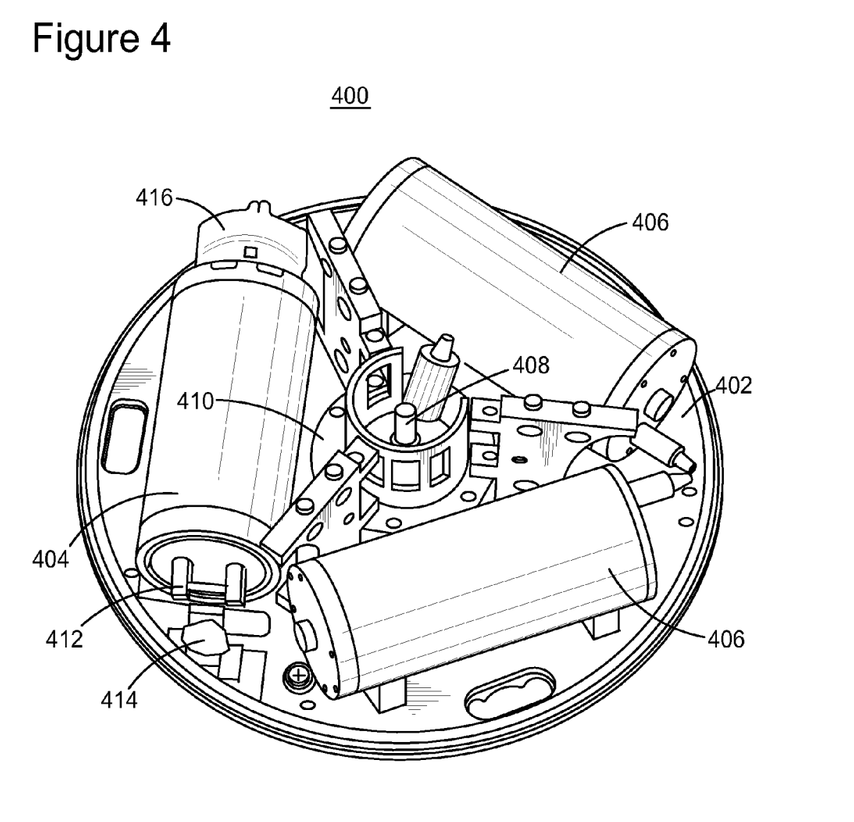
FIG. 4 is a schematic diagram of an ocean bottom node.

A further improved autonomous ocean bottom node seismic recording device (Trilobit node disclosed in U.S. Pat. No. 7,646,670, the entire content of which is incorporated herein by reference) having an integrated modular design and one or more features that assist coupling of the unit to the seafloor and improve the azimuthal fidelity of seismic signal measurement (vector fidelity) has been developed by the assignee of the present patent application. An example of a Trilobit node 400 is shown in FIG. 4. The node 400 has a base plate 402 holding various components, including a signal recording unit housing 404 and two battery housings 406. A hydrophone 408 is positioned in the center of the vector sensor housing 410. The vector sensor housing may also include geophones. Also shown in FIG. 4 is a handle 412 which allows for removal of the recording unit from the device, a clamp 414 which allows for securing of the recording unit when installed in the device, and a fixed connector 416, located at the rear of the signal recording unit housing, to allow for a communication connection between the recording unit and other components of the device.

However, even this node has its own limitations, e.g., the node needs to be returned to the vessel for the data to be removed, and the batteries need to be charged. Because the batteries are fixedly attached to the base plate, the charging process may take a number of hours, during which time the node cannot be used.

Accordingly, it would be desirable to provide systems and methods that provide a marine node for recording seismic waves that can be retrieved on the vessel and readied for a next deployment in a short period of time.

SUMMARY

According to one exemplary embodiment, there is a marine node for recording seismic waves underwater. The node includes a first module configured to house a seismic sensor; bottom and top plates attached to the first module; a second module removably attached to the first module and configured to slide between the bottom and top plates, the second module including a first battery and a first data storage device; and a third module removably attached to the first module and configured to slide between the bottom and top plates, the third module including a second battery.

According to another exemplary embodiment, there is a marine node for recording seismic waves underwater. The node includes a chassis; bottom and top plates attached to the chassis; a first module configured to slide between the top and bottom plates to removably attach to the chassis and configured to house a seismic sensor; and a second module configured to slide between the top and bottom plates to removably attach to the chassis and configured to house a battery. The battery provides electrical power to the seismic sensor.

According to still another exemplary embodiment, there is a method for seismically surveying a subsurface. The method includes a step of placing a node on the ocean bottom, the node including a first module configured to house a seismic sensor, bottom and top plates attached to the first module, a second module removably attached to the first module and configured to slide between the bottom and top plates, the second module including a first battery and a data storage device, and a third module removably attached to the first module and configured to slide between the bottom and top plates, the third module including a second battery; a step of recording seismic data with the seismic sensor; a step of storing the seismic data in the data storage device; a step of retrieving the node from water; a step of replacing the first and second modules with corresponding modules having their batteries charged; and a step of redeploying the node for further seismic data acquisition.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of an ocean bottom node having seismic sensors and being deployed underwater for performing seismic recordings.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

New marine seismic surveys need a system of seismic nodes that can be deployed in shallow water, used to record seismic waves, and then recovered and quickly readied for a new deployment. These nodes need to be compact and easy to manipulate. Also, these nodes need to have their data downloaded and the batteries replaced in the shortest time possible. A novel node that fulfills these requirements is described herein. The node has separate compartments for a recording unit and sensors, batteries and data storage. These compartments may be sandwiched between two coupling plates. The compartments and their masses are distributed to maintain the symmetry necessary for vector fidelity. The batteries and data storage units are easily removable to allow the node to be placed back in to service almost immediately after recovery. Replacement batteries and data storage are swapped with the used ones in a matter of minutes. Thus, the node is ready for a new mission while the used batteries are recharging, and the original data storage unit is processed to download the recorded data. The node is light and compact, enabling deployment in large quantities from smaller vessels used in shallow-water operations. Such a node may advantageously be used in areas where it is too congested or too sensitive to use ocean-bottom cables or towed streamers.

According to an exemplary embodiment, such a node has one or more seismic sensors. The seismic sensors may include at least one of a hydrophone, geophone, accelerometers, electromagnetic sensors, etc. If an electromagnetic sensor is used, then a source that emits electromagnetic waves may be used instead or in addition to an acoustic source.

Figure 5A:
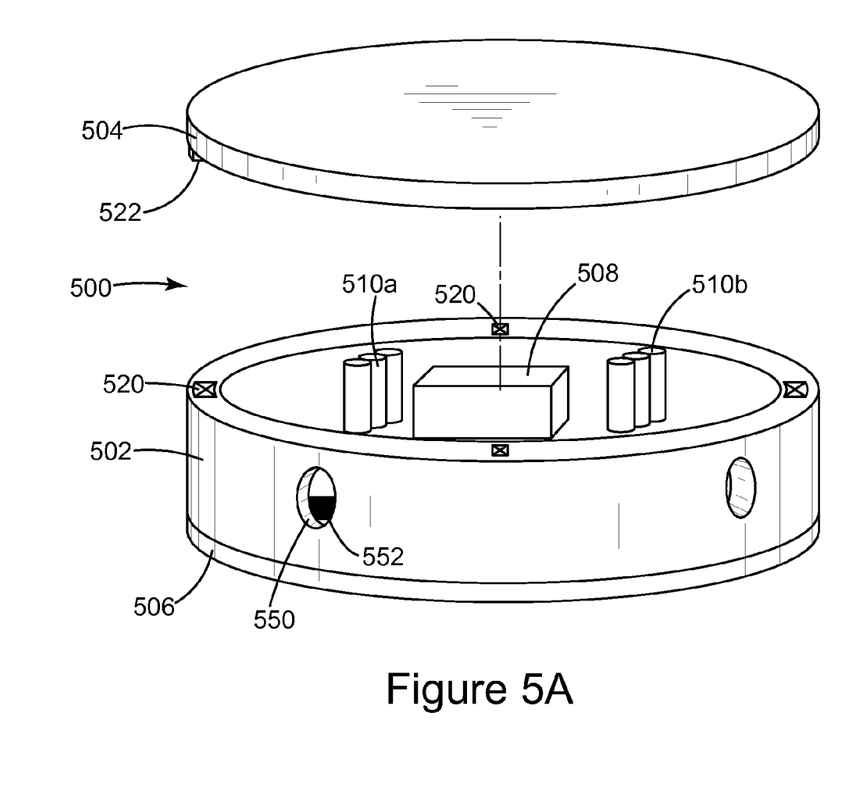
FIGS. 5A and 5B illustrate an ocean bottom node having replaceable batteries and a data storage device according to an exemplary embodiment.
Figure 5B:
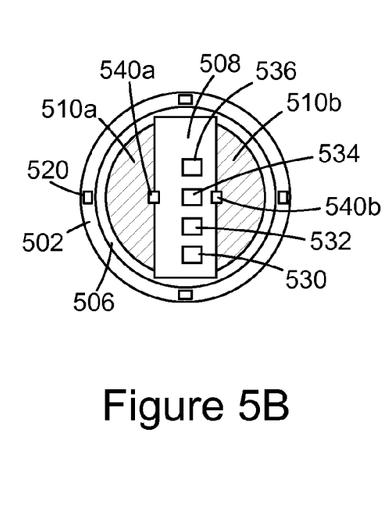

According to an exemplary embodiment illustrated in FIG. 5A, a node 500 includes a housing 502 that might have a cylindrical shape. Bottom plate 506 and top plate 504 may be attached to the housing 502 to fully enclose the inside components. The inside components may include a recording and sensors unit 508 and one or more batteries 510a and 510b. The recording and sensors unit 508, as shown in FIG. 5B, may include one or more seismic sensors 530, a data storage device 532, a processor 534 for controlling data collection and storage, a device (e.g., a GPS synchronized clock) 536 for generating a time stamp for the recorded data, etc. All these components may be in the recording and sensors unit 508. The recording and sensors unit 508 may be configured to be attached to the bottom plate 506. The recording and sensors unit 508 may also include connectors 540a and 540b for electrically connecting to batteries 510a and 510b. Thus, batteries 510a and 510b are removably attached to the recording and sensors unit 508. FIG. 5A also shows that the housing 502 has one or more holes 550 for allowing water to enter in a limited space inside the housing where one or more sensors are located. In another application, one or more sensors (e.g., hydrophone 552) are positioned in the hole(s) 550 for measuring seismic waves and no water enters the housing 502.

In one exemplary embodiment illustrated in FIG. 5B, when the node 500 is brought on the vessel, the top plate 504 is removed (clamping mechanism 520 and 522 may be used to keep the top plate 504 attached to the housing 502, e.g., screws, magnets, etc.), the recording and sensors unit 508 and batteries 510a and 510b are removed, and a new set of recording and sensors unit and batteries are attached to the base plate. The top plate is then reattached to the housing and the node is ready (e.g., in a matter of minutes) for a new mission.

In another exemplary embodiment, only batteries 510a and 510b and the data storage device 532 are removed from the node 500. In other words, the sensor units and the processor remain within the housing 502 for a next mission. In one application, the batteries and the storage device can be removed without removing the top plate, e.g., through corresponding holes either in the housing 502 or the top plate 504.

Figure 6A:
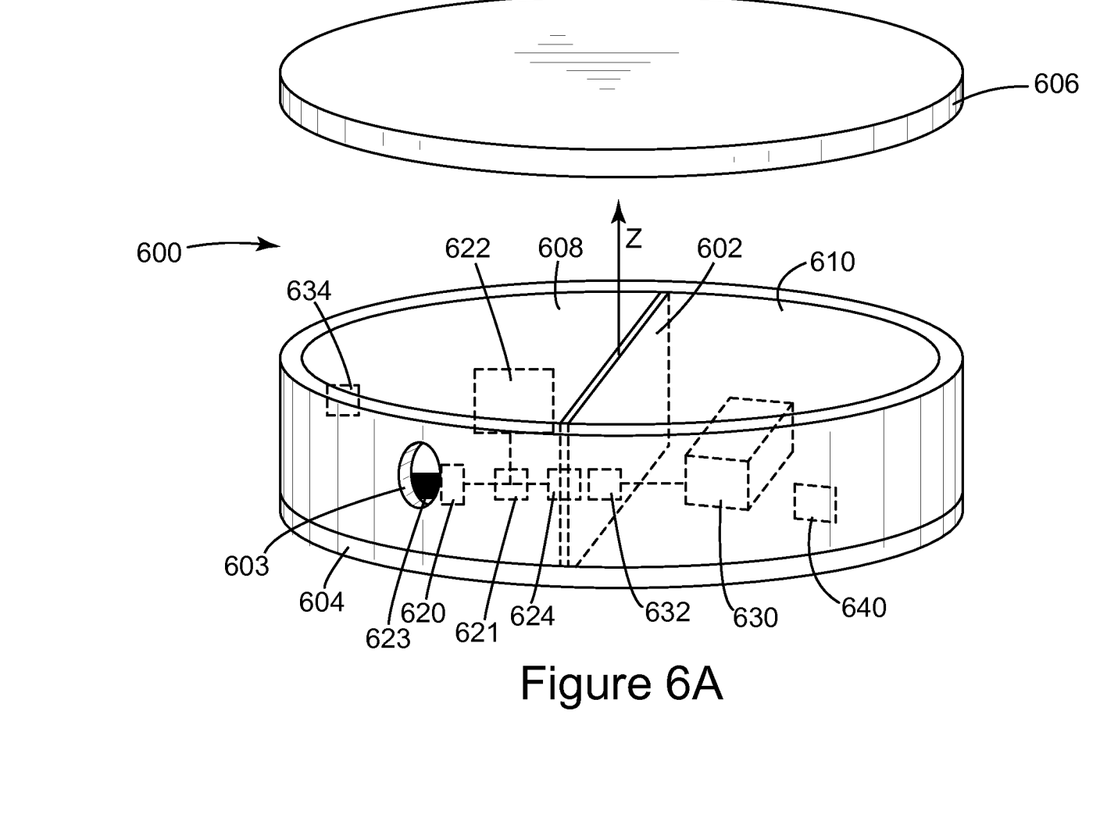
FIGS. 6A and 6B illustrate another ocean bottom node having replaceable batteries and a data storage device according to an exemplary embodiment.
Figure 6B:
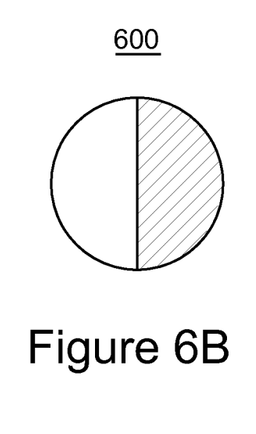

In still another exemplary embodiment illustrated in FIG. 6A, a sandwich-type node 600 is presented. The node 600 has a chassis 602 to which a bottom plate 604 is attached. A top plate 606 may be removably attached to the chassis 602. Two modules 608 and 610 are configured to slide between the top and bottom plates to electrically connect to each other, as discussed later. The modules may be designed to weigh the same so the node's weight is symmetrically distributed along vertical axis Z (see FIG. 6B). The first module 608 may include a sensor pack 620 (including one or more sensors, e.g., a hydrophone and three geophones), a recording unit 621, and a storage device 622. The recording unit 621 may include electronics necessary for processing electrical signals from the sensor pack, e.g., digitizing them. The storage device 622 may be of any type used in the art for storing data. The sensor pack 620 may include a hydrophone 623 that fluidly communicates with an ambient (e.g., water) of the node through a hole 603 formed in the first module's housing. In this way, either the water enters the housing freely and is in direct contact with the hydrophone or the hydrophone exits the housing to contact the water. The first module 608 may also include, as noted above, a processor, an interface 624 for receiving power and exchanging data with the second module 610, and other customary equipment for a node (e.g., communication interfaces, GPS synchronized clock, etc., as illustrated in FIG. 5B).

The second module 610 may include a battery 630 connected to an interface 632. The interface 632 may be configured to electrically connect to the interface 624 of the first module 608. The interfaces 632 and 624 are waterproof. In another application, an optional battery 634 may be located in the first module 608, and a storage module 640 may be located in the second module 610.

The two modules 608 and 610 may be detachably attached to the chassis 602 and/or the bottom and top plates. Methods and means for detachably attaching modules to each another are known in the art and also described in FIGS. 8A-D.

Figures 7A, 7B, 7D:
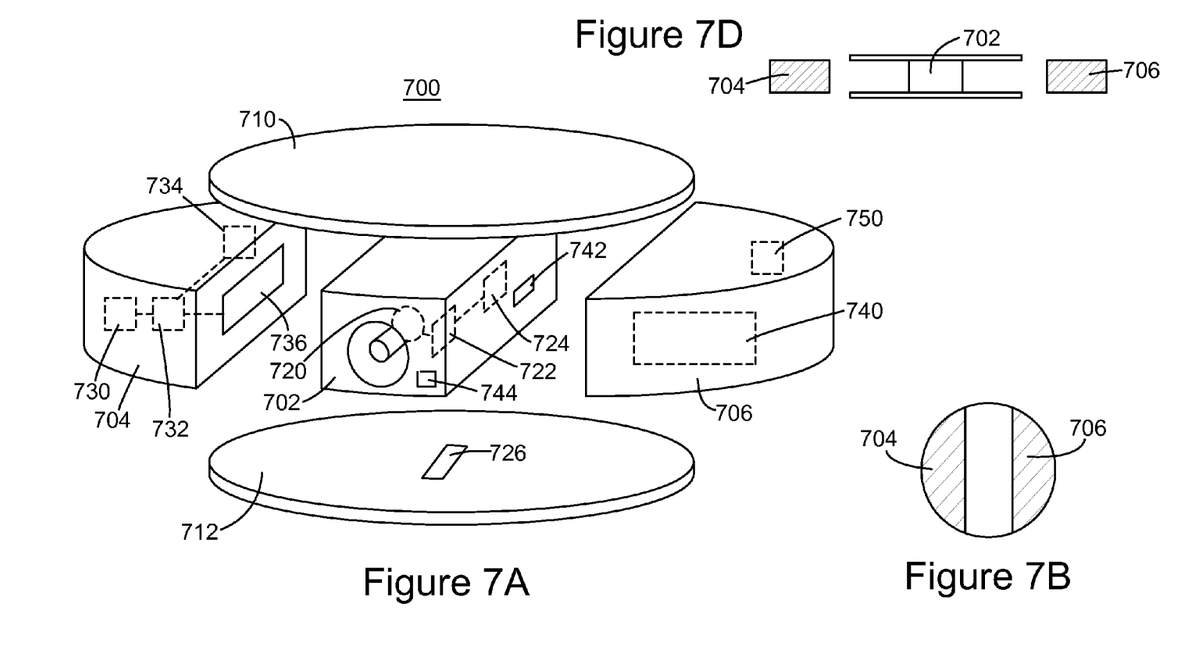
FIGS. 7A-D illustrate still another ocean bottom node having replaceable batteries and a data storage device according to an exemplary embodiment.
Figure 7C:
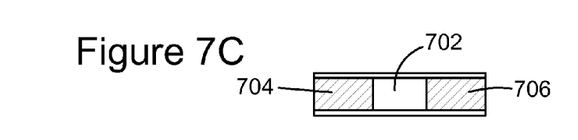

In another exemplary embodiment illustrated in FIGS. 7A-C, a node 700 has three modules 702, 704 and 706 sandwiched between top plate 710 and bottom plate 712. The first module 702 (recorder and sensors module) includes sensors 720 and 722 (e.g., a hydrophone and a geophone) and a recording unit 724 connected to the sensors and configured to receive and process (e.g., digitize) electrical signals from the sensors. The recording unit 724 may include a storage device for temporarily storing the seismic data until it is sent to the data storage device to be discussed later. The recorder and sensors module 702 is removably attached to one or both plates 710 and 712 by known means, e.g., a clip 726.

The second module 704 (battery and data module) includes, besides a battery 730, a data storage device 732 capable of permanently storing the data processed by the recording unit 724. A wired and/or wireless interface 734 may also be located inside the battery and data module 704 for transferring the recorded data to the vessel when the module is retrieved on the vessel. If a wired interface is used, a port (not shown) is placed on the outside of the battery and data module.

The battery and data module 704 has a second port 736 configured to electrically connect to a corresponding port (not shown) on the recorder and sensors module 702 to provide electric power and also to transfer data from the recording unit 724 to the data storage device 732.

The third module 706 includes a battery 740 connected to a port (not shown) that electrically connects to a corresponding port 742 (waterproof connector) of the recorder and sensors module 702 for providing power. The recorder and sensors module 702 may include a processor or controller 744 for coordinating which module supplies power to the recorder and sensors module 702 at any given time. Also, the controller 744 may coordinate with the recording unit 724 for transmitting seismic data to the data storage device 732. Optionally, the third module 706 may also include a data storage device 750 for storing data recorded by the seismic sensors. In this case, the controller 744 decides when data is stored in the data storage device 732 or in the data storage device 760. For example, the controller may store data in a first storage unit until that storage is full and then switch the storage to the second storage unit. Alternatively, the controller may store the data in the first storage unit and back up that data into the second storage unit. As still another alternative, the controller may store the data in both the first and second storage units by interleaving it.

Having the second and third modules 706 and 708 symmetrical (e.g., both including the same components) may provide the following advantage. When the node is on the vessel and personnel need to quickly replace used batteries with new batteries, it may be more efficient to have two identical modules so personnel do not have to spend time identifying which sides of the node will accept the second and third modules. Also, for the same reason, it would be more efficient to have a single type of module stored on the vessel rather than two types. Further, if the two modules are identical, the entire node's weight is much easier to symmetrically distribute. FIG. 7A shows possible shapes of the three modules. For example, the first module may be a rectangular cuboid, while the second and third modules may be half-cylinders.

FIG. 7B shows that the modules 704 and 706 may have symmetrical shapes and sizes for balancing the node's weight so that, when delivered on the ocean bottom, the node is as stable as possible. FIG. 7C shows a cross-section of the node 700, with FIG. 7D showing the modules 704 and 706 being removed for data transfer and/or recharging. By locating a data storage device 732 inside the battery and data module 704, the node 700 may be quickly prepared for a next deployment because both the data and power source are replaced during a single operation. In other words, the node does not have to be connected to a data network for downloading the data, thus requiring the node to stay for a long time on the vessel. As soon as the battery and data module is replaced with a new module, the node is ready to be redeployed.

Figure 8A:
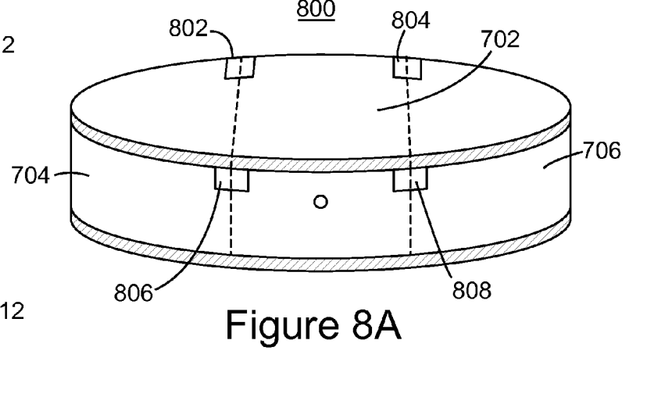
FIGS. 8A-D illustrate various means for keeping various components of a node together according to an exemplary embodiment.

FIGS. 8A-8D show various approaches for fixing the battery and data modules to the node. FIG. 8A shows a node 800 configured similarly to the node shown in FIG. 7A. The second and third modules 704 and 706 can be removably attached to the first module by using, for example, attaching devices 802 to 808. In this particular embodiment, there are two attaching devices per module and the attaching devices may be clamps.

Figure 8B:
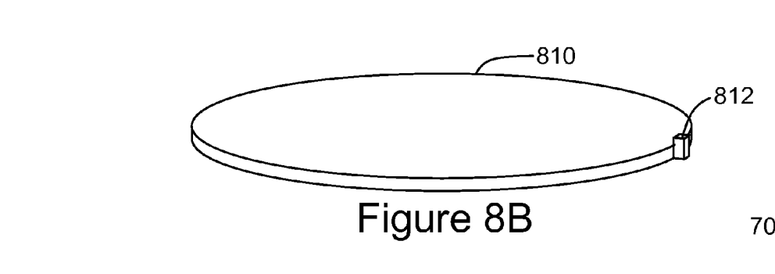
Figure 8C:
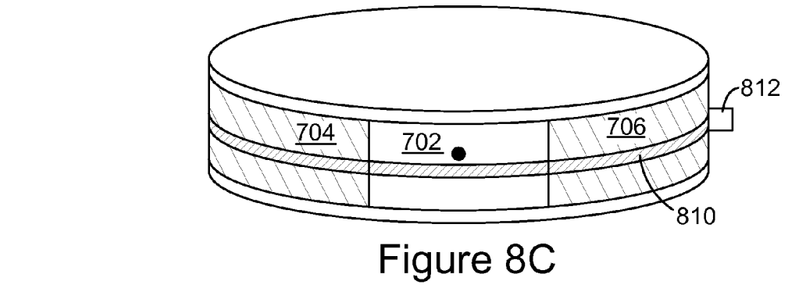
Figure 8D:
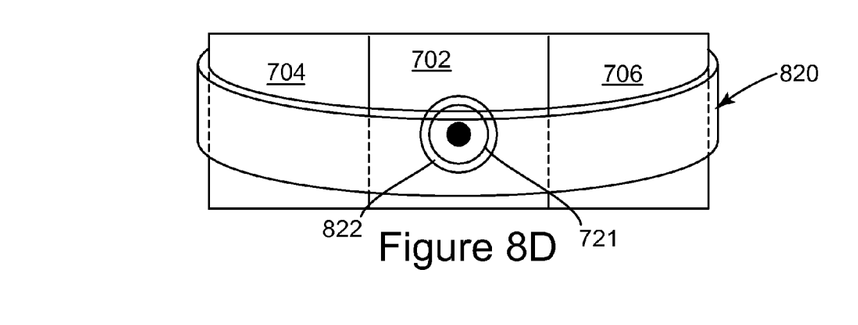

In another embodiment, FIG. 8B shows a band 810 having at least one clamp 812 and this assembly may be used, as shown in FIG. 8C, to lock in place the second and third modules 704 and 706. The band 810 may be made of metal, plastic, polymer, etc. Alternatively, a tire-like sleeve 820 may be slipped over the node when fully assembled to prevent the modules from coming apart. The sleeve 820 may have a hole 822 that corresponds to the hole 721 in the first module 702 to freely allow water to contact the hydrophone. The sleeve may be made of polyurethane or other similar material. In one application, a combination of the above approaches may be used to lock the modules to the node.

The following considerations are equally valid for any of the above-discussed embodiments. Any of the above-discussed modules that include a recording unit may have a pressure-sealed recording unit that houses multi-channel (1 to 4 or more) seismic recording devices, a high-accuracy clock synchronized by GPS or other means to time-stamp samples as they are recorded, and a number of sensor devices to measure the data to be recorded. Examples of such sensors are three components of seafloor velocity, three components of seafloor acceleration, separately or in conjunction with at least one hydrophone to measure the seismic pressure field in the water column. Other sensors types envisioned include, for example, temperature, salinity, water particle velocity, electromagnetic signals, etc.

The recording unit is removably mounted to a chassis (e.g., chassis 602 and base plate 604) that in turn can couple to the seafloor to mechanically connect the sensors to the seafloor to accurately measure seafloor motion. This chassis also allows the hydrophone to be exposed to the water column to accurately record the seismic pressure signal. Further, the chassis may provide the necessary coupling means for other sensors included in the recording unit.

The recording unit may be sandwiched between two circular plates that provide the necessary coupling to accurately measure seafloor motion. The plates may have other shapes, e.g., rectangular, hexagonal, etc. The distribution of mass within the assembled node is designed to maintain the natural symmetry of a circular plate or other symmetrical shape. This symmetrical distribution is considered to improve vector fidelity. The aspect ratio (height/base diameter) of the node may be kept low to optimize stability and avoid rocking moments when the node is subjected to sea-bottom currents.

Further, the mass may be distributed such that the node can be adequately coupled when landing on either of its flat surfaces. Furthermore, the edges or tether attachment (used to attach the node to an autonomous underwater vehicle) of the node may be designed so that it preferably lands on either of its flat surfaces, rather than on its side. Alternatively, the nodes may be distributed individually or connected to each other in "strings" using, chains, ropes, cables, etc. in order to accelerate deployment and retrieval. The recording device has one or more waterproof connectors (e.g., 736) to allow power to be supplied to it and for data recorded to be transferred to a storage device (e.g., 732).

In addition, the recording unit may have a device for two-way communication to an external configuration and clock synchronization unit that is used to program the recording unit in preparation for a recording session, or after such session to re-synchronize the clock and check the data. Such communication device may be a connector, Wi-Fi, optical, or other two-way communication interfaces.

The node, as already discussed, may include one or more removable battery packs. The battery pack is pressure-sealed and has a waterproof connector that can mate to a similar receptacle on the recording unit or chassis. Thus, when these units are engaged and held in the node chassis, the recording unit receives power from the battery pack. The removable battery pack can be recharged in a charging station to be ready for the next deployment. Alternatively, the battery pack may be single-use and disposable.

Preferably, the node and recording unit utilize two rechargeable battery packs arranged symmetrically and within the circumference of the two circular plates. Further, a removable data storage device is provided. This device may be a solid-state memory or other device that can receive and store recorded data from the recording unit in a temporary (non-volatile) manner with, or preferably without, the need for a power source. The data storage device is connected to the recording unit via a pressure-sealed connection. The recorded data from the seismic recording unit is stored on this data storage device during the recording session, while the recording unit and sensors are active. The data is stored until the data storage device is disconnected from the recording unit and connected to a downloading terminal, at which time the data is moved to a permanent storage location for further handling and analysis. The data storage device can then be cleared (i.e., erased) once a good-quality copy of the data is verified. At this time, the data storage device is ready to be connected to another node chassis and recording unit to start another recording session.

In one application, the data storage device is embedded within one or more of the battery units such that the connections to the recording unit for data and for power are through a common waterproof connector interface. Additionally, while downloading the data from the data storage device, the battery can be recharged, making the whole unit ready for re-deployment after this concurrent charging and downloading process is complete.

A complete node may also have the recording unit including three orthogonally-arranged velocity or acceleration sensors and one hydrophone, two removable battery packs, at least one containing a data storage device, and sandwiched between two circular coupling plates. In operation, a node chassis with recording unit and sensors is connected with one or two battery packs, at least one battery pack containing a data storage device.

Figure 9:
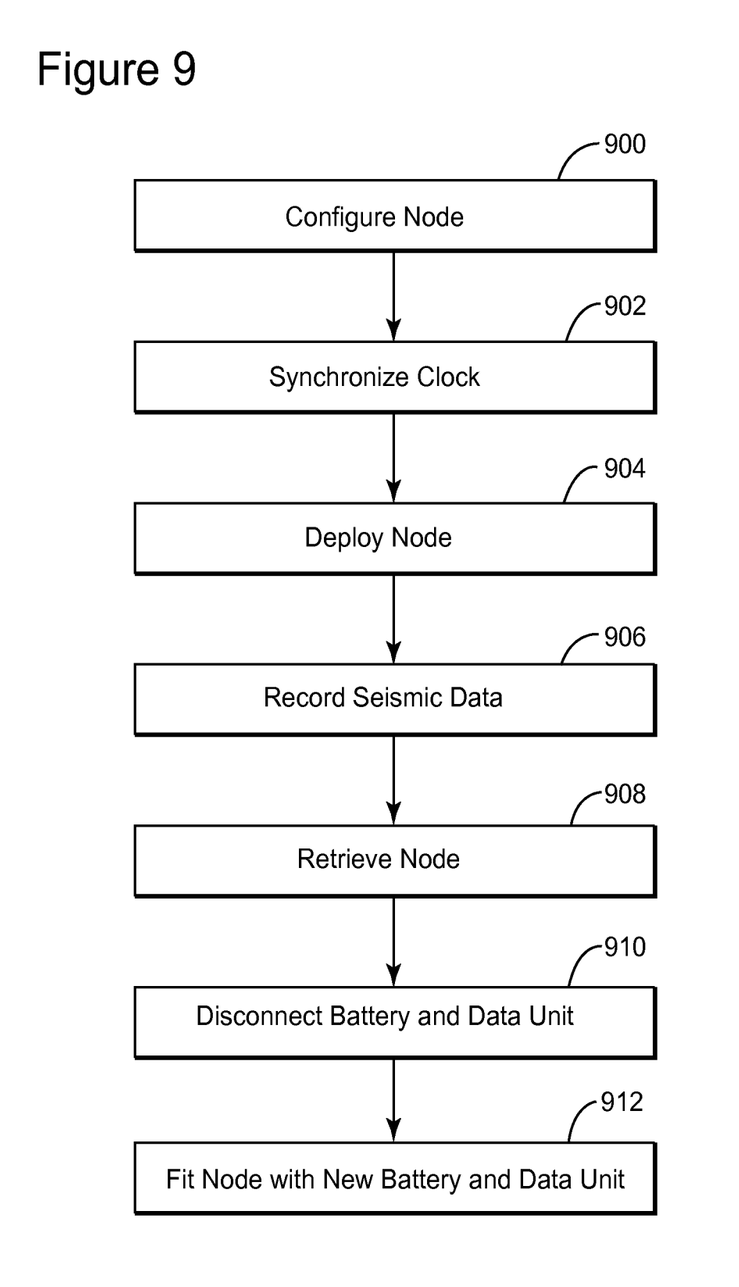
FIG. 9 is a flowchart of a method for deploying and recovering a node according to an exemplary embodiment.

In an exemplary embodiment illustrated in FIG. 9, the node may be configured in step 900 by a service unit (e.g., located on the vessel) that uses a direct connection or a wireless (e.g., Wi-Fi) interface, with the correct recording parameters for the project. In step 902, the internal clock of the node is synchronized using GPS signals. In step 904, the node is deployed on the ocean bottom at a desired location. The node may be deployed by using a crane on the vessel, if the water is shallow, or using an autonomous underwater vehicle (AUV), a submarine, or other means known in the art. In one application, plural nodes are connected to each other, i.e., "strung" together and deployed in this way. In step 906 the recording is started and seismic data is collected. The GPS receiver position may be matched to the node's serial number and logged for future reference, either by manual entry, by barcode scan, by RFID reader or other means. Alternatively, the surface deployment point's position may be log using GPS and then estimate the nodes sub-surface positions. Once deployed and resting on the seabed, the node's position can be confirmed by direct arrival picking from the data or by acoustic transponder or other location techniques. The node remains on location during the programmed recording session. On completion of the recording session, the node is recovered in step 908 and the clock re-synchronized in order to calculate and compensate for any clock drift during the recording session.

Once this task is completed, the batteries, including the data storage device, are disconnected in step 910 from the node chassis and connected to a device that recharges the battery and downloads and checks the data. Meanwhile the node chassis can be fitted in step 912 with other recharged and cleared data storage and made ready for re-deployment. Such an operational process ensures a minimum number of node chassis and recording units are necessary to conduct a survey and their operating time is maximized.

The vector sensor used in the node may be, for example, one or more of a geophone, a piezo-electric accelerometer, a capacitive accelerometer, a MEMS accelerometer, a hydrophone accelerometer, one or more hydrophones, rotational sensors, etc. The rotation sensors may measure the pitch, roll and yaw components of the wave motion. The vector sensors measure the X, Y, Z translational motions.

In one exemplary embodiment, the number of nodes is in the hundreds or thousands. Thus, a deployment vessel is configured to hold all of them at the beginning of the survey and then to launch them as the seismic survey is advancing. If a dedicated recovery vessel is used to recover the nodes, then the deployment vessel is configured to switch positions with the recovery vessel when the deployment vessel becomes empty.

Although it is desired to keep the node simple and light, various other components may be implemented in the node if necessary. Such a component may serve to provide communication between the node and a vessel (deployment, recovery, or shooting vessel) and may be based on various technologies, i.e., acoustic waves, electromagnetic waves, etc. According to an exemplary embodiment, a Hi PAP system may be used. The Hi PAP system may be installed on any one of the participating vessels and may communicate with the acoustic system of the node.

The Hi PAP system exhibits high accuracy and long-range performance in both positioning and telemetry modes due to automatic beam-forming transducers that focus the sensitivity toward its targets or transponders. This beam can not only be pointed in any direction below the vessel, but also horizontally and even upward to the surface because the transducer is spherical.

Thus, Hi PAP is a hydro-acoustic Super Short Base Line (SSBL) or USBL, towfish tracking system, able to operate in shallow and deepwater areas to proven ranges in excess of 3000 meters. It is a multi-purpose system used for a wide range of applications, including towfish and towed platform tracking, high-accuracy subsea positioning, and telemetry and scientific research.

Another example of a unit that may be installed on the node is an inertial navigation system (INS). The INS may control a trajectory of the node assuming that the node is provided with one or more motors that drive corresponding propellers and/or controllable fins.

The nodes illustrated in FIGS. 5A to 7D are advantageous for shallow-water applications and to be manufactured and operated in high volume. Utilization is higher because the intelligent (and costly) part of the node can be kept in service (recording) independent of battery charging and data downloading. Compact design allows flexible deployment as a hybrid system with OBC or land equipment or in a stand-alone operation.

One or more of the exemplary embodiments discussed above disclose a node configured to perform seismic recordings. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A marine autonomous seismic node for recording seismic waves underwater, the node comprising:
 a first module configured to house a seismic sensor pack, wherein the seismic sensor pack detects the seismic waves;
 bottom and top plates attached to the first module;
 a second module removably attached to the first module and configured to slide between the bottom and top plates, the second module including a first battery;
 a third module removably attached to the first module and configured to slide between the bottom and top plates, the third module including a second battery; and
 a data storage device housed within the node, the data storage device comprising non-volatile memory;

wherein both of the second module comprising a first battery and the third module comprising a second battery are independently removable from the node without removing the first module from the node or the data storage device from the node.

2. The node of claim 1, wherein the seismic sensor pack includes a hydrophone and three geophones.

3. The node of claim 1, wherein the second and third modules have the same weight.

4. The node of claim 1, wherein the first module has a rectangular cuboid shape and the second and third modules have a shape of a half of a cylinder.

5. The node of claim 1, wherein the shape of the node is a cylinder.

6. The node of claim 1, wherein the second module has an interface that connects to an interface of the first module to exchange power and data.

7. The node of claim 1, wherein the third module has an interface that connects to an interface of the first module to exchange power.

8. The node of claim 1, wherein the data storage device is located in the first module.

9. The node of claim 1, further comprising:
an attaching device configured to lock the second and third modules to the first module.

10. The node of claim 9, wherein the attaching device includes at least one clamp.

11. The node of claim 9, wherein the attaching device includes a band.

12. The node of claim 9, wherein the attaching device includes a sleeve.

13. The node of claim 1, wherein the first module is configured to remain in the node when the second or third modules are removed.

14. The node of claim 1, wherein the node is configured for redeployment after the second or third modules are removed and replaced.

15. The node of claim 1, wherein the data storage device is coupled to the first module by a wireless interface connector.

16. The node of claim 1, further comprising a first connector interface between the second module and the first module and a second interface connector between the third module and the first module, wherein the first and second interface connectors comprise a wireless interface.

17. The node of claim 1, wherein the second module and third module are on opposing sides of the first module within the node.

18. A marine autonomous seismic node for recording seismic waves underwater, the node comprising:
a chassis;
bottom and top plates attached to the chassis;
a first module configured to slide between the top and bottom plates to removably attach to the chassis and configured to house a seismic sensor pack, wherein the seismic sensor pack detects the seismic waves; and
a second module configured to slide between the top and bottom plates to removably attach to the chassis and configured to house a battery; and
a data storage device comprising non-volatile memory,
wherein the battery provides electrical power to the seismic sensor pack;
wherein the second module comprising the battery may be removed from the node without removing the first module from the node or the data storage device from the node.

19. The node of claim 18, wherein the first module comprises:
a recording unit for digitizing electrical signals from the seismic sensor pack;
and a storage device for storing the digitized signals from the recording unit.

20. The node of claim 18, wherein the seismic sensor pack includes a hydrophone and three geophones.

21. The node of claim 18, wherein the first and second modules have a same weight.

22. The node of claim 18, wherein the first and the second modules have a shape of a half a cylinder and the shape of the node is a cylinder.

23. The node of claim 18, wherein the second module has an interface that connects to an interface of the first module to exchange power and data.

24. The node of claim 18, further comprising:
an attaching device configured to lock the second module to the first module, wherein the attaching device includes at least one of a clamp, a band, or a sleeve.

25. A marine autonomous seismic node for recording seismic waves underwater, the node comprising:
a housing;
a first unit attached to the housing and configured to house a seismic sensor; and
a second unit removably attached to the housing and configured to house a battery;
a third unit attached to the housing and configured to house a data storage device,
wherein the second unit comprising the battery is independently removable from the node without removing the first unit from the node or the data storage device from the node.

26. The node of claim 25, wherein the housing comprises a bottom plate and top plate, such that the first and second units are located between the bottom and top plates, wherein at least the second unit is configured to be removed from the node without removal of the bottom plate or top plate.

27. The node of claim 25, wherein the battery is a pressure-sealed battery pack configured to couple with the first unit by sliding the second unit into contact with the first unit.

28. A method for seismically surveying a subsurface, the method comprising:
placing an autonomous seismic node on the ocean bottom, the node including
a first module configured to house a seismic sensor pack, bottom and top plates attached to the first module,
a second module removably attached to the first module and configured to slide between the bottom and top plates, the second module including a first battery,
a third module removably attached to the first module and configured to slide between the bottom and top plates, the third module including a second battery, and
a data storage device located in the node comprising non-volatile memory;
recording seismic data with the seismic sensor pack;
storing the seismic data in the data storage device;
retrieving the node from water;
replacing at least one of the second module with the first battery or the third module with the second battery with corresponding modules having their batteries charged, wherein the first module and the data storage device is configured to remain in the node when the second module with the first battery or the third module with the second battery is replaced; and redeploying the node for further seismic data acquisition.

29. The method of claim 28, wherein the node may be independently redeployed without redeploying other nodes.

* * * * *